United States Patent [19]

Mizutani

[11] Patent Number: 4,751,568
[45] Date of Patent: Jun. 14, 1988

[54] IMAGE INFORMATION READING APPARATUS WHICH DISCRIMINATES BETWEEN COLORS

[75] Inventor: Motoharu Mizutani, Tokyo, Japan

[73] Assignee: Kabushiki Kaisha Toshiba, Kawasaki, Japan

[21] Appl. No.: 878,357

[22] Filed: Jun. 25, 1986

[30] Foreign Application Priority Data

Jun. 26, 1985 [JP] Japan .................. 60-139500

[51] Int. Cl.⁴ .................................... H04N 1/40
[52] U.S. Cl. ........................... 358/75; 358/75
[58] Field of Search ........................... 358/75, 79

[56] References Cited

U.S. PATENT DOCUMENTS

| | | | |
|---|---|---|---|
| 4,479,242 | 10/1984 | Kurata | 358/75 |
| 4,518,988 | 5/1985 | Saitoh | 358/75 |
| 4,546,381 | 10/1985 | Kurata | 358/75 |
| 4,553,160 | 11/1985 | Yamamoto | 358/75 |

*Primary Examiner*—Michael A. Masinick
*Attorney, Agent, or Firm*—Finnegan, Henderson, Farabow, Garrett and Dunner

[57] ABSTRACT

A picture image is scanned and identified as white and black portions according to the tone of the picture image to form a binary picture image signal. Picture images of tones other than white and black are detected and the detected picture image signals are modulated in accordance with predetermined modulation patterns. The modulated picture image signals are synthesized with the binary picture image signal.

8 Claims, 3 Drawing Sheets

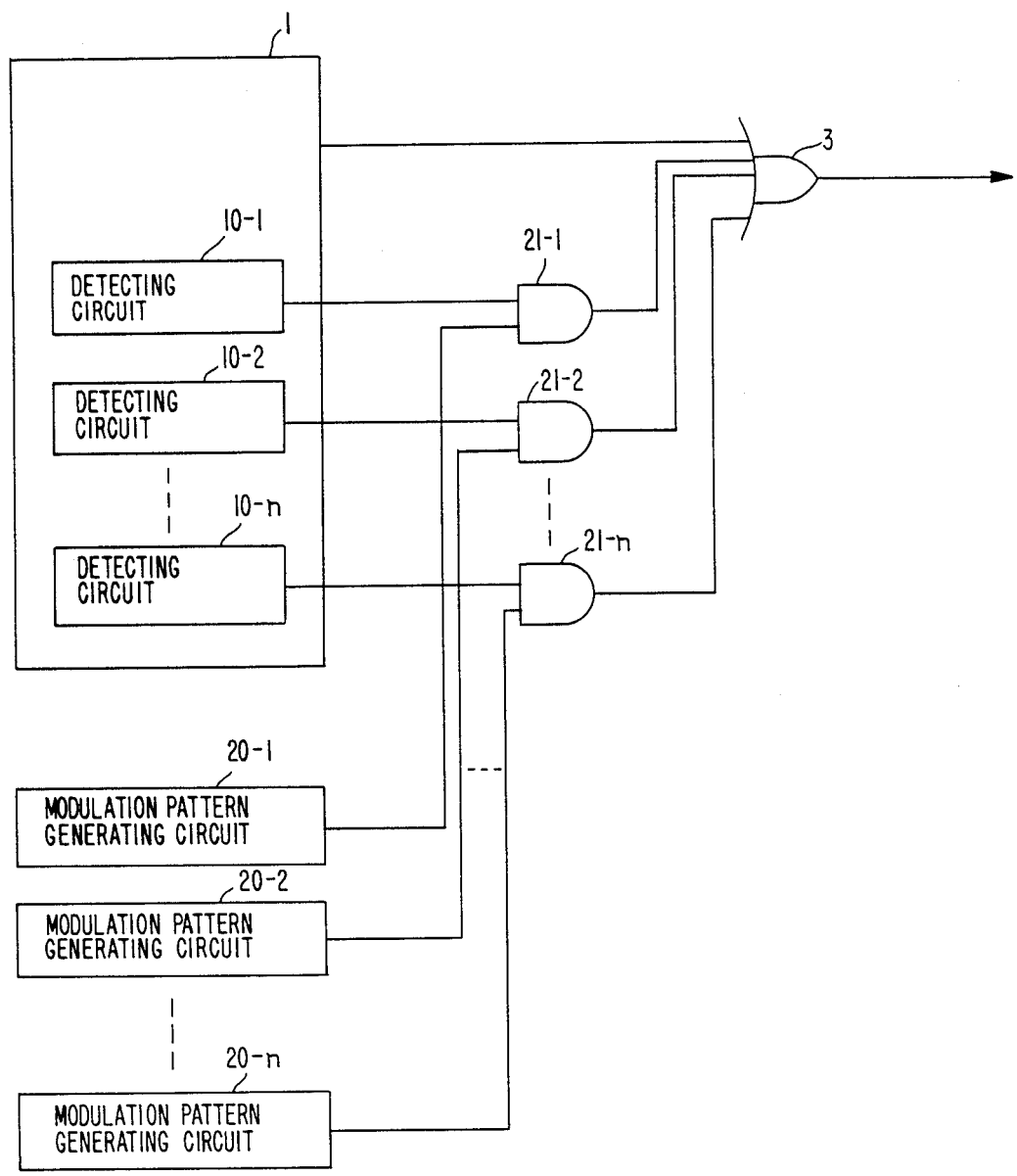

IMAGE INFORMATION READING APPARATUS WHICH DISCRIMINATES BETWEEN COLORS

BACKGROUND OF THE INVENTION

1. Field of the Invention

This invention relates to picture image reading apparatus utilized in facsimile apparatus, a copying machine or the like, and more particularly to picture image reading apparatus capable of processing tones other than white and black.

2. Description of the Prior Art

In facsimile apparatus, a copying machine or the like, the following two methods have been used for reading a picture image depicted on a manuscript and then printing the read picture image on a recording paper. According to one method, the read picture image is identified as white and black picture images according to the tone or concentration of the picture image, the identified picture images are derived out as binary signals which are supplied to recording apparatus for recording read out picture images. According to another method, read out picture images are identified as picture images of multitones according to their tones, the identified picture images are derived as multivalue picture image signals which are supplied to a recording device for recording picture images including half tones between white and black.

In actual manuscripts, however, black characters of the picture images are often traced or underlined with red ink. Accordingly, according to the first method of deriving out binary picture image signals, as shown in FIG. 5a, where characters ABCD are written with black and characters EF are written with red, the characters EF will be recorded as black picture images just like the characters ABCD as shown in FIG. 5b so that it is impossible to represent characters EF in a different manner from the black characters.

According to a method wherein characters are derived as multivalue picture image signals, characters EF written with red ink will be recorded with a little lower tone or concentration than characters ABCD as shown in FIG. 5c, so that characters ABCD and EF can be discriminated in that they are depicted with different tones. However, since contamination and ground tone of the manuscript are also expressed as multivalue signals, noise appears in the recorded picture image, thus degrading the quality of the recorded picture images as shown in FIG. 5c.

SUMMARY OF THE INVENTION

Accordingly, it is an object of this invention to provide improved image information reading apparatus capable of recording clear picture images of colors other than white black without degrading picture quality and which can be clearly discriminated from white and black picture image portions.

According to this invention, there is provided image information reading apparatus comprising means for scanning an image information to be read, means for identifying white and black portions of the picture image for producing binary picture image signals, means for detecting picture images of colors other than white and black contained in the picture image to be read, modulating means for modulating the picture image signal detected by the detecting means, and means for synthesizing the output signal of the modulating means and the binary output signal.

BRIEF DESCRIPTION OF THE DRAWINGS

In the accompanying drawings:

FIG. 4 is a block diagram showing a modified embodiment of this invention, and

DESCRIPTION OF THE PREFERRED EMBODIMENTS

Figure 1:
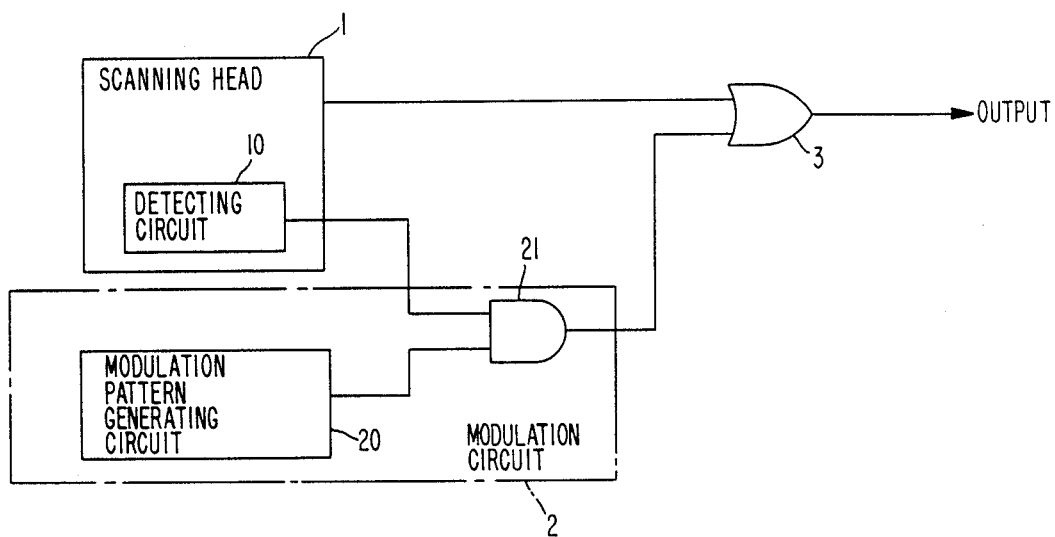
FIG. 1 is a block diagram showing one embodiment of this invention.
Figure 2:
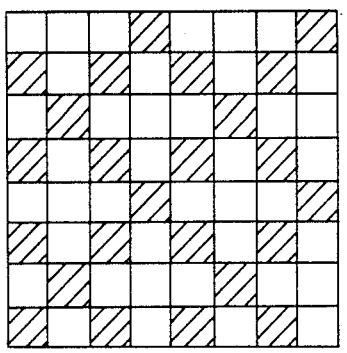
FIG. 2 shows a pattern used in the embodiment shown in FIG. 1.

A preferred embodiment of this invention shown in FIG. 1 comprises a scanning head 1 which sequentially scans a picture image on a manuscript for identifying white and black picture images to obtain a binary picture image signal G1. For example, when the tone or concentration is lower than a predetermined level, signal G1 is "0" indicative of a white portion whereas when the tone is higher than a predetermined level, signal G1 is "1" indicative of a black portion. The scanning head 1 contains a detection circuit 10 that detects a picture image of a color, for example red, other than white and black picture images. Upon detection of a red picture image, the detection circuit 10 outputs a different binary picture image signal G2, which is modulated in an AND gate circuit 21 by a modulation signal in accordance with a predetermined modulation pattern generated by modulation pattern generating circuit 20 of modulation circuit 2. An example of such a pattern is shown in FIG. 2. The modulated signal is applied to one input terminal of an OR gate circuit 3, with other input terminal connected to receive the white/black picture image signal G1. The output of the OR gate circuit 3 is supplied to such external apparatus such as a recording apparatus.

Figure 3:
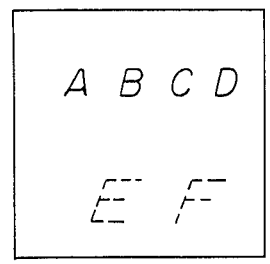
FIG. 3 shows recorded picture images obtainable with the embodiment shown in FIG. 1.
Figure 5A:
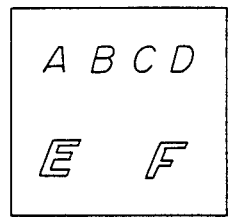
FIGS. 5a, 5b, and 5c show recorded picture images formed with prior apparatus.
Figure 5B:
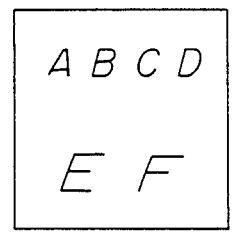
Figure 5C:
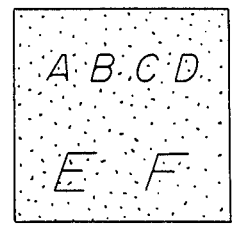

Consequently, the red characters EF among the characters shown in FIG. 5a of a manuscript is detected as being red and is reproduced as a picture image modulated by the pattern shown in FIG. 2. The resulting image of the red characters EF can be distinguished from other characters and emphasized, as shown in FIG. 3. Since the picture image of red characters is in a binary format, no noise caused by contamination of the manuscript appears, thereby preventing decrease of the picture quality.

The detection circuit can be constructed to detect picture images of colors other than red, for example, blue and green. Then, only the picture images of blue and green are modulated with predetermined modulation patterns and then outputted.

The detection circuit may be constructed such that it can detect picture images of colors in which cyan, yellow and magenta are not balanced, that is, picture images of any color other than white and black. In this case too, read out picture images of tones other than white and black are modulated with predetermined modulation patterns. Instead of using the pattern shown in FIG. 2 as the modulation pattern, a mesh dot pattern can also be used.

In a modification shown in FIG. 4, a plurality of detection circuits 10-1 through 10-n respectively detecting picture images of colors other than white and black contained in a picture image to be read, are provided in the scanning head. Furthermore, a plurality of modulation pattern generating circuits 20-1 through 20-n are provided for generating predetermined modulated patterns for modulating multicolor picture images outputted from respective detection circuits.

The modulated picture image signals are synthesized by OR gate circuit 3 through AND gate circuits 21-1 through 21-n.

What is claimed is:

1. An image reading apparatus for reading a picture image on a medium to produce plural binary image signals, said binary image signals each being representative of a specific color when reproduced, comprising:
   means for producing a first binary image signal by scanning said medium;
   means for detecting the specific color contained in said picture image by scanning said medium and outputting a second binary image signal corresponding to the specific color of said picture image;
   means for modulating said second binary image signal; and
   means for synthesizing an output signal from said first binary image signal and said modulated second binary image signal.

2. The image reading apparatus according to claim 1 wherein said detecting means detects a picture image of one color other than black or white contained in said picture image.

3. The image reading apparatus according to claim 1 wherein said detecting means detects picture images of a plurality of colors other than black or white contained in said picture image.

4. The image reading apparatus according to claim 1 wherein said detecting means detects a picture image of colors contained in said picture image other than white and black according to a balance of cyan, yellow and magenta.

5. The image reading apparatus according to claim 1 wherein said modulating means comprises pattern generating means for generating a predetermined modulation pattern, and further including a logic product means for producing a logic product of said second binary image signal and said modulation pattern.

6. The image reading apparatus according to claim 1 wherein said synthesizing means comprises logic sum means responsive to said first binary image signal and said modulated second binary image signal to produce the output signal.

7. The image reading apparatus according to claim 1 wherein said detecting means detects a picture image of a plurality of colors contained in said picure image, and outputs a plurality of second binary image signals corresponding to said plurality of colors.

8. The image reading apparatus according to claim 7 wherein said modulating means modulates said plurality of second binary image signals with different modulating patterns.

* * * * *